(12) United States Patent  
Schiller

(10) Patent No.: US 8,463,695 B2  
(45) Date of Patent: *Jun. 11, 2013

(54) SYSTEM, REPORT, AND COMPUTER-READABLE MEDIUM FOR ANALYZING A STOCK PORTFOLIO

(75) Inventor: Victor Hugo Schiller, Charlottesville, VA (US)

(73) Assignee: O2 Media LLC, Charlottesville, VA (US)

( * ) Notice: Subject to any disclaimer, the term of this patent is extended or adjusted under 35 U.S.C. 154(b) by 314 days.

This patent is subject to a terminal disclaimer.

(21) Appl. No.: 12/764,680

(22) Filed: Apr. 21, 2010

(65) Prior Publication Data

US 2010/0205114 A1    Aug. 12, 2010

Related U.S. Application Data

(62) Division of application No. 11/556,031, filed on Nov. 2, 2006, now Pat. No. 7,716,116.

(51) Int. Cl.  
*G06Q 40/00* (2012.01)

(52) U.S. Cl.  
USPC ............................... 705/37; 705/35; 705/36 R

(58) Field of Classification Search  
USPC ..................................................... 705/35–37  
See application file for complete search history.

(56) References Cited

U.S. PATENT DOCUMENTS

| | | | |
|---|---|---|---|
| 7,006,991 B2* | 2/2006 | Keiser et al. | 705/37 |
| 2002/0111891 A1* | 8/2002 | Hoffman et al. | 705/36 |
| 2002/0174056 A1 | 11/2002 | Sefein et al. | |
| 2003/0225657 A1 | 12/2003 | Whaley et al. | |
| 2003/0225658 A1 | 12/2003 | Whaley | |
| 2004/0039683 A1 | 2/2004 | Mcgeorge | |
| 2005/0086150 A1 | 4/2005 | Serpico et al. | |
| 2005/0144107 A1 | 6/2005 | Plonski | |
| 2005/0187851 A1* | 8/2005 | Sant | 705/36 |
| 2006/0074785 A1 | 4/2006 | Festog et al. | |
| 2006/0100949 A1 | 5/2006 | Whaley et al. | |
| 2006/0277124 A1* | 12/2006 | Gerrietts, II | 705/35 |
| 2007/0016497 A1 | 1/2007 | Shalen et al. | |
| 2007/0162365 A1 | 7/2007 | Weinreb | |
| 2007/0299758 A1* | 12/2007 | Zosin et al. | 705/36 R |

* cited by examiner

*Primary Examiner* — Jagdish Patel  
*Assistant Examiner* — Sara C Hamilton  
(74) *Attorney, Agent, or Firm* — Vedder Price P.C.

(57) ABSTRACT

The present invention generally relates to a method for automatically generating a series of natural language news-based stories to be presented via a digital interface or printed publication to a portfolio user, and more specifically to a filter or selection of a handful of relevant and desired financial instruments, or events created in a large group of events such as sports results, travel information, auction related data, online shopping tools, social media, retail store promotion generation, search engine daily report, etc. for a specific use. These financial instruments, based on different selections from a portfolio manager via a management tool, are then used to either produce a strategies page where a list of useful covered call trade and hedged trade are displayed in the form of a table, or natural language news-based stories relating to a selected list of financial instruments found in a portfolio.

3 Claims, 6 Drawing Sheets

SYSTEM, REPORT, AND COMPUTER-READABLE MEDIUM FOR ANALYZING A STOCK PORTFOLIO

CROSS REFERENCE TO RELATED APPLICATIONS

This application is a divisional of co-pending U.S. patent application Ser. No. 11/556,031 filed Nov. 2, 2006, which is hereby incorporated herein in its entirety by reference.

FIELD OF THE INVENTION

The present invention generally relates to an analysis system, a income portfolio trade report, and a computer-readable medium for analyzing a stock portfolio, and more particularly the system, report, and medium using optimal covered call trades, optimal hedge trades, and a key rating in conjunction therewith for analyzing a stock portfolio and increasing equity gains.

BACKGROUND OF THE INVENTION

Corporations and other legal entities offer stocks to raise capital through the issuance and distribution of shares. Investors purchase shares through a stock market in which stocks and other securities are traded. These stock markets include, as well-known examples, the National Association of Securities Dealers Automated Quotations (NASDAQ) and the New York Stock Exchange (NYSE). Shares are purchased, held, and sold by third-party facilitators and grouped in portfolios of stocks and other securities. Most stock markets are managed and operated by a corporation or a mutual fund organization called a stock exchange, which often serves as a trading agent. These exchanges also create indexes such as the S&P 500 that groups 500 well-known companies listed in the NASDAQ or the NYSE. These stock exchanges assign a unique stock symbol to each corporation trading shares. For example, Microsoft Corporation is assigned the symbol MSFT, International Business Machine the symbol IBM, and The 3M Company the symbol MMM. Most stock exchanges or index providers rate stocks to guide investors in evaluating the worth of the stock at a precise moment in time based on contemplated future performance of the stock and/or the associated corporation. These service providers also provide financial analysis of the listed corporations and offer tools for the management of investment portfolio. For instance, S&P uses a STAR rating system, indicating the probability that a stock may be sold and depreciate in the future. The S&P STAR rating ranges from one star (strong sales contemplated) to five stars (weak sales contemplated).

Stock trades generally revolve around the purchase of a specific stock at a Purchase Price (PP) and the resale of the stock at a different sale price (SP) after market fluctuations have occurred, raising or lowering the current price (CP). Traders generally profit (P) if the resale price is higher than the purchase price shown by the equation P=SP−PP. A trader incurs a loss if the stock is sold at a price lower than the purchase price. Another way to quantify a profit from the sale of a stock in the present is P=CP−PP. A primary objective is to benefit from a transaction by selling stock at higher prices than the purchase price. Indexes are potential indicators of average and median values of CP for the entire market.

Over the years, secondary trading instruments have been developed by stock markets analysts to regulate and protect portfolios of stocks from excessive market fluctuations. One of these instruments is known as a "call option," or more simply, a "call." Another instrument is called a "put option," or more simply, a "put." The call and the put are options that may be traded alongside stocks and may be become part of a portfolio of assets even if they do not represent actual shares in stock. A call is a financial contract between the owner of a stock and a potential purchaser stating that the potential purchaser has a right, but not an obligation based on jurisdictions, to buy a stock from the owner at an agreed price. The call is reasonably associated with an expiration date called a strike date (SD), a date at which the contact expires. Generally, the agreed price of a call is called the bid price (BP) and corresponds to a value at which the parties agree to sell the stock on or before the strike date. A BP is normally higher than the CP of the stock on the stock market. The price paid for the call is a "premium" and is fixed between the parties. For example, a buyer holding $30 in cash can buy a share of stock with a CP of $30 and hope to profit if the CP increases. If a SP of $35 is obtained after as SD of 10 days, the buyer will have made a profit of $5. Once the buyer is in possession of the stock, he or she must wait patiently for fluctuations in the market to change the CP of his purchased stock. A second solution is to purchase a call from a third party in possession of a stock. Market conditions can dictate that the stock with a CP of $30 has a premium of $1 associated with a BP of $33 at an SD ten days later. In essence, the buyer pays $1 for the right to purchase the stock at the BP on the SD. Profit in that second option is only made if the CP at the SD is higher than the BP plus the premium. The profit from the trade of a call (Pc) is given by the following equations:

$$Pc\{SD\}=[CP\{SD\}-BP]-\text{Premium}$$

$$\$1=Pc\{SD\}=[\$35-\$33]-\$1$$

The trade of a put option contract works in a similar way. The put has an analogous premium, for example $1 relating to a SD also in the future. At the SD, a trader is given the right to sell at a BP, for example at $27, a value that will hopefully be lower than the CP, which may have lowered to $25, by way of example. The profit (Ps) in that case would then be given by the following equations:

$$Ps\{SD\}=[BP-CP\{SD\}]-\text{premium}$$

$$\$1=Ps\{SD\}=[\$27-\$25]-\$1$$

What is substantially different between a Pc and a Ps is the necessity to invest only BP instead of PP in order to obtain a profit. In the above examples, a PP of $30 would return a P of $5 or a profit of 17% while a BP of $1 would return a Pc or Ps of $1 or a 100% return on investment. Trading in call and put contracts is regarded as a risky investment because of the leverage effect between PP and Premium, and also because the CP may not reach the BP on the SD, which results in the premium being lost. Gain is achieved only if the CP reaches a value above the BP for a call and under the SP for a put above premium.

Other instruments exist to mitigate the risks associated with call and put contracts. A "covered call" (CC) is the concurrent use of a stock trade in a company and a put option contract relating to the stock in the portfolio. The covered call corresponds to securing the ownership in a stock and selling to a second party at a premium the profits associated with the situation where the stock reaches a high value above a BP. For example, the owner of 100 shares in International Business Machine (IBM) with a CP or PP of $70 per share may sell an option to a second party, fixing the BP at $80 per share for a premium of $2 per share at a SD. This CC corresponds to foregoing any potential benefits if the CP of IBM is higher than the BP at the SD in exchange for an immediate return of $2 per share. On an annualized basis, if the owner repeats this operation several times (N), in way of example 3 times in a year corresponding to a SD of four months, and the CP of the stock changes to $73 at the end of the year, an annualized return (AR) for the CC can be computed as follows:

$$AR=100*[P+\{Premium*N\}]/PP=[\{CP-PP\}+\{Premium*N\}]/PP$$

$$12.9\%=100*[\{73-70\}+\{2*3\}]/70=100*9/70$$

Whereas the benefit from the trade of the stock corresponds to 4.3% of the AR, the benefit from the three successive put contracts during the trade period is 8.6%. The benefit from the put contract associated with the underlying stock trade can be quantified alternatively as a downward protection (DP), a profit from the put contract that may be used to compensate for a light drop in the CP of the stock when compared to the initial PP. In the above example, the DP is 8.6%, and indicating that if the CP falls as low as $64, then the put contract protects the stock owner and places his overall investment at zero.

The downside to the covered call is the obligation to sell the stock if it performs at or above the expectations fixed in the option contract. In the above example, if the stock price reaches $80 per share at any time during the three put contract SDs, or any moment during the trade, the stock owner is forced to sell the stock to the contract holder at $10 above the CP. While this situation corresponds to a positive benefit from the trade, the stock owner generally wishes to maintain the position and is forced to purchase the stock at the CP and not the BP at a loss. What is needed is a tool designed to help stock traders to determine optimal CC trades that increase the AR while minimizing losses associated with a repositioning after an undesirable sale.

In yet another trade scenario, a trader may not wish to pay the PP of a stock in order to undertake a CC. In that case, a substantial risk is linked with the rapid increase of the CP and the need to sell a stock at a price that is not in the portfolio of an investor. The investor would have to purchase the stock at CP and sell it at the SP, suffering a loss. One possible solution is a hedge trade (HT) where a trader initiated a put option contract on a stock that is not owned in a portfolio but instead acquired a call contract with a longer SDc to cover any put option exercised against the portfolio. A HT is defined as the concurrent ownership of a short-lived put option contract on a stock and the ownership of a longer-lived buy option contract designed to be exercised prematurely if the put option contract is also exercised at or before the SDc. HT profits (Pht) are calculated by adding the different Premiums of the successive contracts minus the prices paid as premium on the call contract if no forced trades are initiated correlated to the price recovered when the call contract is exercised or replaced by a second call contract with a new SDc. By way of example, hedge trading with the above put contract of IBM at a premium of $2 for four months for a BPs of $80, and the purchase of an associated call contract designed to remain active during the period at the lowest value possible may correspond to buying at a premium of $40 a call with a BPc of $28. The advantage of taking on such a low position is to ensure that the call, on a stock with a CP of $70 is not likely to be exercised, and can be exercised with the best value at any time. The high BPc of the call is offset by the actual redemption value of the contract when the put is exercised. In the above example, the Pht if the CP remains within BPc and BPs, and where a position drops from $70 to $67 while remaining between $80 and $30, and not forcing a sale corresponds to a profit of:

$$Pht=(premium*N)-premium\ call+(CP-BPc)$$

$$\$5=Pht=\$2*3-\$28+(\$67-\$40)$$

The hedge trader receives $6 from the three put contracts and pays $28 to be able to exercise a call contract at $40 that is worth $67 on the market for a total benefit of $5. In the situation where the put contract is exercised by the buyer (where the CP rises above the BP at SDc), then the buy option must be exercised, in this example during the second period of Put contract (N=2), and the profit is as follows:

$$Pht=(premium*N)-premium\ call+(BPs-BPc)$$

$$\$16=Pht=(\$2*2)-\$28+(\$80-\$40)$$

Where the stock CP is $85 above the BPc of $80 for a stock that initially went from a $70 position to a $85 position. What is needed is a device, method, and/or report that allows an optimal covered call to be determined based on the optimal covered call contract available within these and other parameters. What is also needed is a report, medium, and/or system able to determine the optimal combination of call contracts and put contracts for a selected stock and for a list of stocks in a portfolio. What is also needed is a rating system that allows covered call traders and hedge traders to quickly analyze, within a unique report, what trades are likely to improve the stock portfolio returns and performances.

While a series of specific examples and terms are given illustratively to help with the comprehension and the definition of the different terms, it is understood by one of ordinary skill in the art that flexibility in the terminology and method of application of these concepts may be contemplated based on the rapid change in the technology and the nature of stock and option trading.

BRIEF DESCRIPTION OF THE DRAWINGS

The features of the present disclosure are believed to be novel and are set forth with particularity in the appended claims. The disclosure may be best understood by reference to the following description taken in conjunction with the accompanying drawings. Figures that employ like reference numerals identify like elements.

SUMMARY

In one general embodiment of the present invention, the present invention is directed to a stock portfolio analysis system able to determine an optimal covered call trade for each of a plurality of stocks within a stock investor's portfolio, determine an improved key rating factor associated with each optimal covered call trade, and produce a trade report that displays the optimal trades along with the key rating. In another embodiment of the present invention, the stock portfolio analysis system is able to determine an optimal hedge trade for each of a plurality of stocks within a stock investor's portfolio and provide the information along with a key rating determination in the form of a trade report. In yet another embodiment of the present invention, an income portfolio trade report is produced listing a covered call summary table, or alternatively, a hedge trade summary table, a table explanation section, and a financial summary where each covered call is associated with a key rating. In a further embodiment, the above-described embodiments of the present invention are implemented in a computer-readable medium where the report, information, analysis system are executed by a processor.

DETAILED DESCRIPTION

Figure 1:
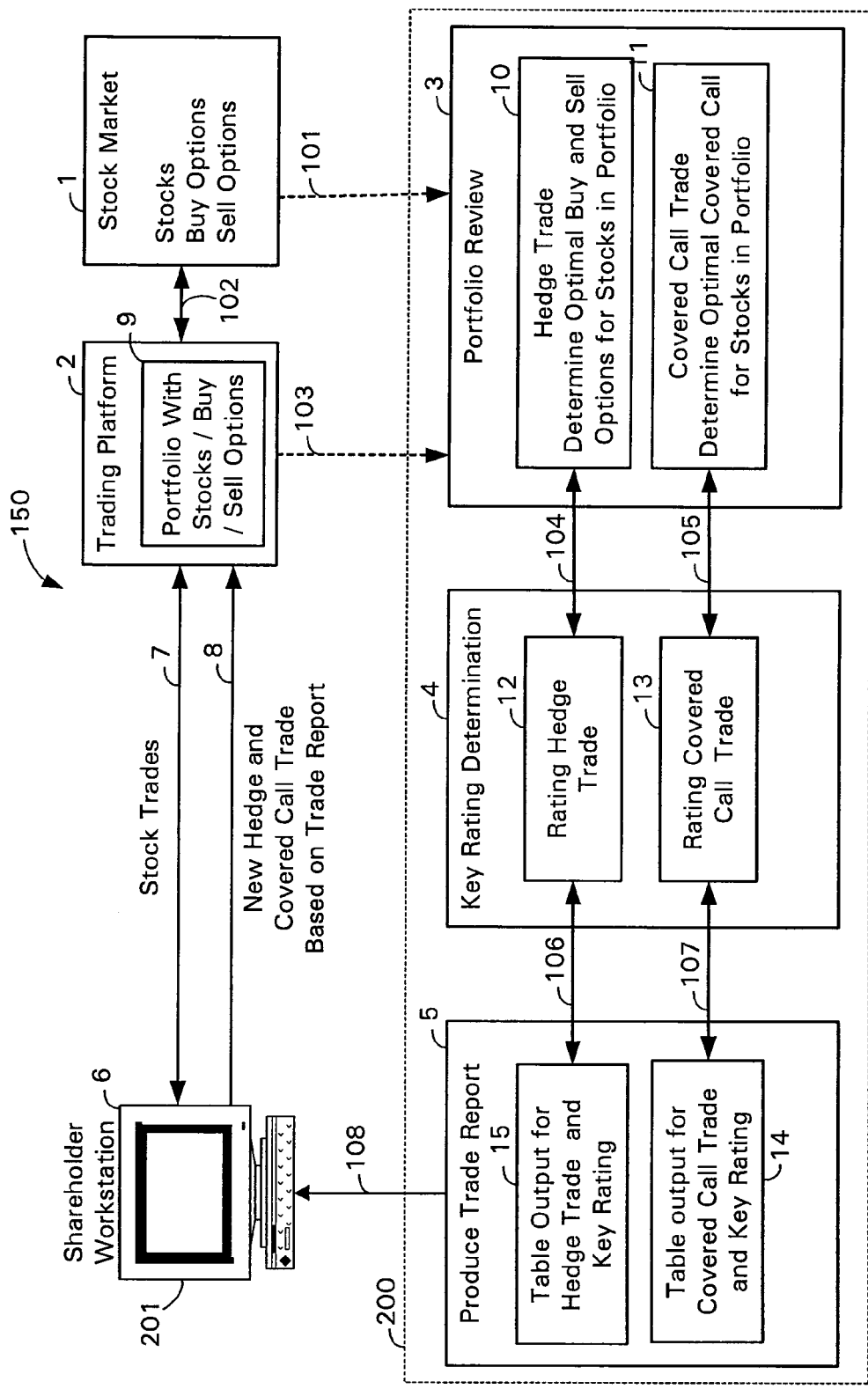
FIG. 1 illustrates the general elements of the stock portfolio analysis system according to one possible embodiment of the present invention.
Figure 4:
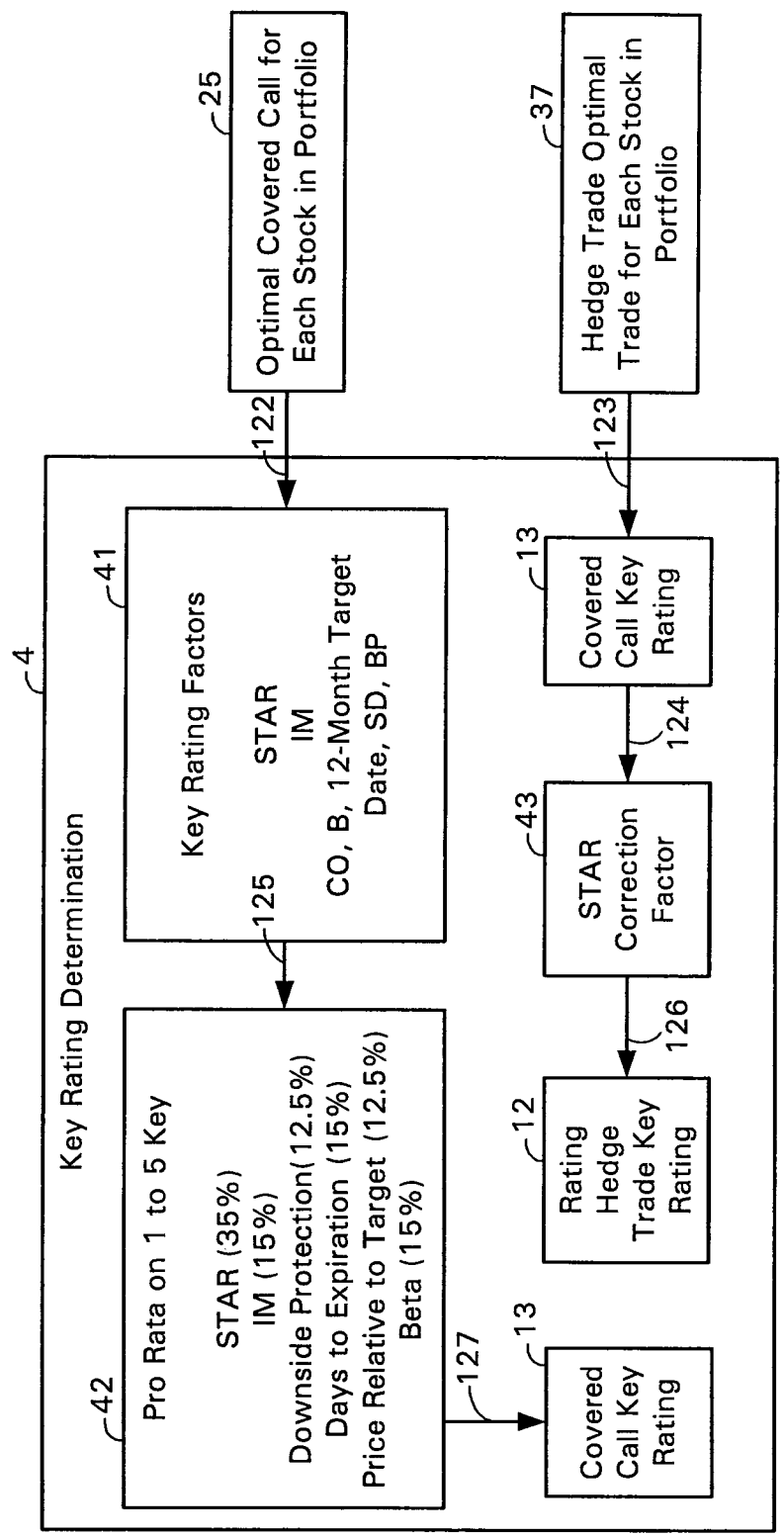
FIG. 4 illustrates in greater details and according to another possible embodiment the key rating determination shown in FIG. 1 for a covered call and a hedge trade.
Figure 5:
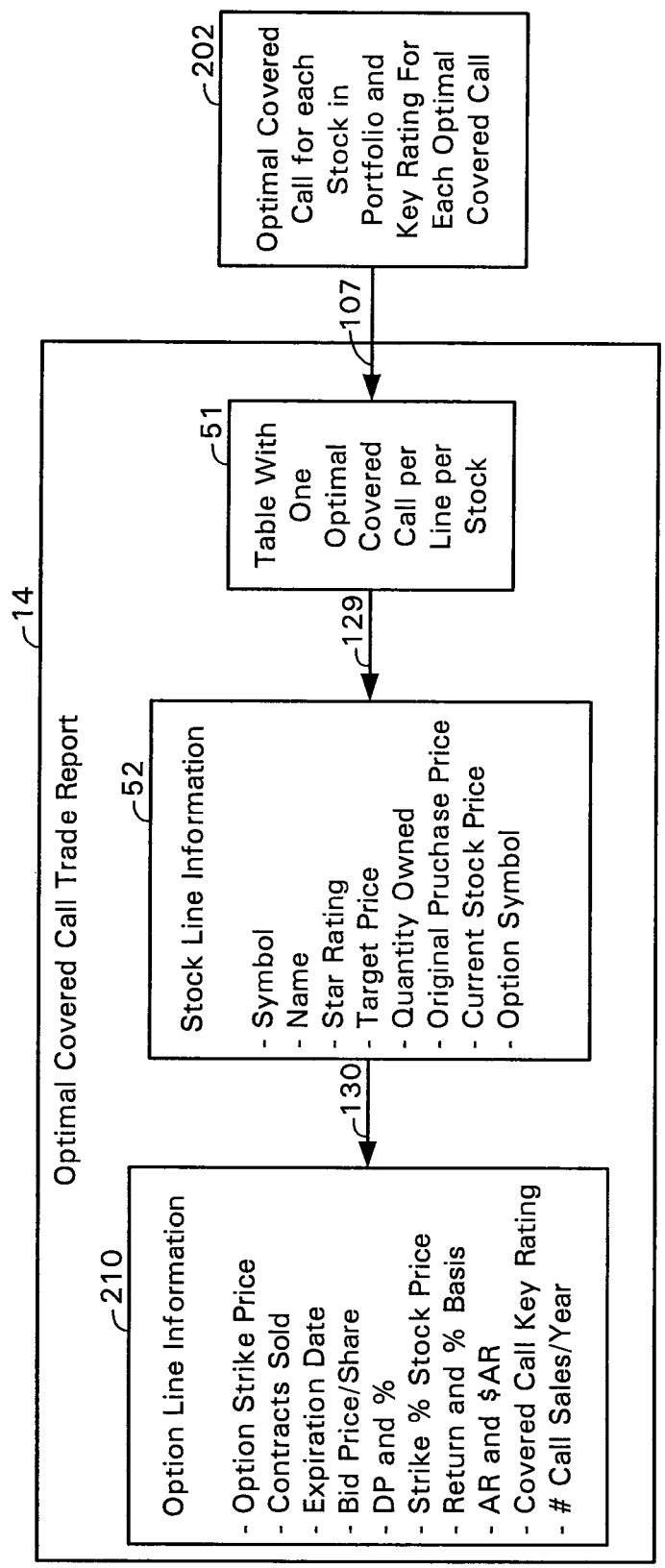
FIG. 5 illustrates in greater details and according to another possible embodiment the optimal report shown in FIG. 1 for a covered call trade.

FIG. 1 illustrates the general elements of the stock portfolio analysis system 150 according to one possible embodiment of the present invention. The stock portfolio analysis system 150 includes a display 6, a calculator 200 for the determination of an optimal covered call trade 11 for each of a plurality of stocks within a stock investor's portfolio, the calculator 200 being operatively coupled to the display 108, a device for generating a trade report 201 on the display 6 the report including at least a data table 14 having a plurality of entries 51 as shown in FIG. 5 corresponding to a plurality of stocks selected from a user stock portfolio 9, the device operatively coupled 108 to the display 6, wherein each entry includes the single optimal covered call trade 202 shown in FIG. 5 selected from a list of available covered call trades for the stock 22 shown in FIG. 2 on a stock market 1, and a key rating calculated using a key rating determination 4 shown in FIG. 4. In an alternate embodiment, the stock portfolio analysis system 150 further includes a trading platform 2 for storing in a memory (not shown) the stock investor's portfolio 9, the trading platform being coupled to the device for generating the trade report 5. In yet another embodiment, the stock portfolio analysis system 150 includes a calculator 3, the key rating determination 4, and the device for generating the trade report 5 are software programs residing in a processing unit 200. In another embodiment, the calculator 3 comprises a preliminary filter 23 shown in FIG. 2 and a secondary filter 24 shown also in FIG. 2. The determination of the single optimal covered call trade 11 in a preferred embodiment, is based on a high value of annualized return 25 of the list of available covered call trades 22 for the stocks 21 having passed the preliminary filter 23 and the secondary filter 24. In another preferred embodiment, the key rating determination 4 comprises a series of key rating factors 41 shown in FIG. 4 the key rating factors 41 in yet another embodiment include the Standard & Poors Star Rating.

FIG. 1 is a possible illustration of a stock portfolio analysis system 150. Currently, stock markets 1, including but not limited to the NASDAQ and the NYSE, are physically located in a central location and offer digital and electronic stock market services such as the trading of stocks and the purchase and sale of stock options. Clients generally referred to as "shareholders" purchase stocks via trading platforms 2 or through other service providers connected electronically 102 with the stock market 1. Trading platforms in some instances manage a portfolio of stocks, bonds, cash, and other investments 9 allocated to a certain shareholder. The shareholder is connected either directly with the trading platform 2 or directly with the stock market 1 via an interface located on the shareholder's workstation 201 or remotely in another workstation. FIG. 1 shows a situation where a single shareholder workstation 6 is connected via lines (shown as elements 7 and 8) to trade stocks 7 or place new hedge and covered call trades 8. While one possible system between a shareholder workstation 201, a trading platform 2, and a stock market 1 is shown as three distinct boxes on FIG. 1, it is understood by one of ordinary skill in the art that trading and purchase of stocks may be conducted by a shareholder or portfolio owner from any computer terminal of via an intermediary using a computer terminal. For example, a shareholder may place a telephone call to a brokerage firm, which in turn places a purchase order and modifies the shareholder's stock portfolio. FIG. 1 is provided by way of illustration, and the relationship of the different entities (a shareholder, a trader, and a market trading platform) may vary without falling outside of the scope of the present disclosure. FIG. 1 further discloses communication interfaces 103 and 101 between the stock market 1 and the trading platform 2. These interfaces are shown as a dashed line to represent the variety of possible configuration contemplated and to illustrate that while two distinct interfaces are shown based on the present disclosure, the use of a single stock market 1 with trading capacity 2 results in a single interface 101 between the stock portfolio 9 of a shareholder and a processing unit 200.

FIG. 1 then illustrates one possible configuration where a processing unit 200 further comprises three distinct modules: software or hardware to perform a portfolio review 3, a key rating determination 4, and a trade report producing element 5. Two parallel data processing lines are shown for the treatment of hedge trade-related information and covered call-related information. The hedge trade-related information is shown above the covered call-related information. These diagrams represent schematically the use of successive modules that allows for the processing of the information collected from the trading platform 2 and or the stock market 1. In successive steps, the information from the portfolio is reviewed 3 in order to determine a covered call trade 11 for each stock in the portfolio or a hedge trade 10 with an optimal buy and put option for each stock. A key rating determination 4 is then performed based on the optimal trades determined in the first step for the hedge trade 12 and for the covered call trade 13. Finally, the information is used and placed within a report shown by module 5. The report includes but is not limited to table-type output 14, 15. It is understood by one of ordinary skill in the art that while different functions and diagrams are shown as a preferred embodiment, what is contemplated is the use of the disclosed information in any number of reasonable arrangements in association with the relevant technology in order to produce similar means in substantially the same ways, using substantially the same functions.

Figure 2:
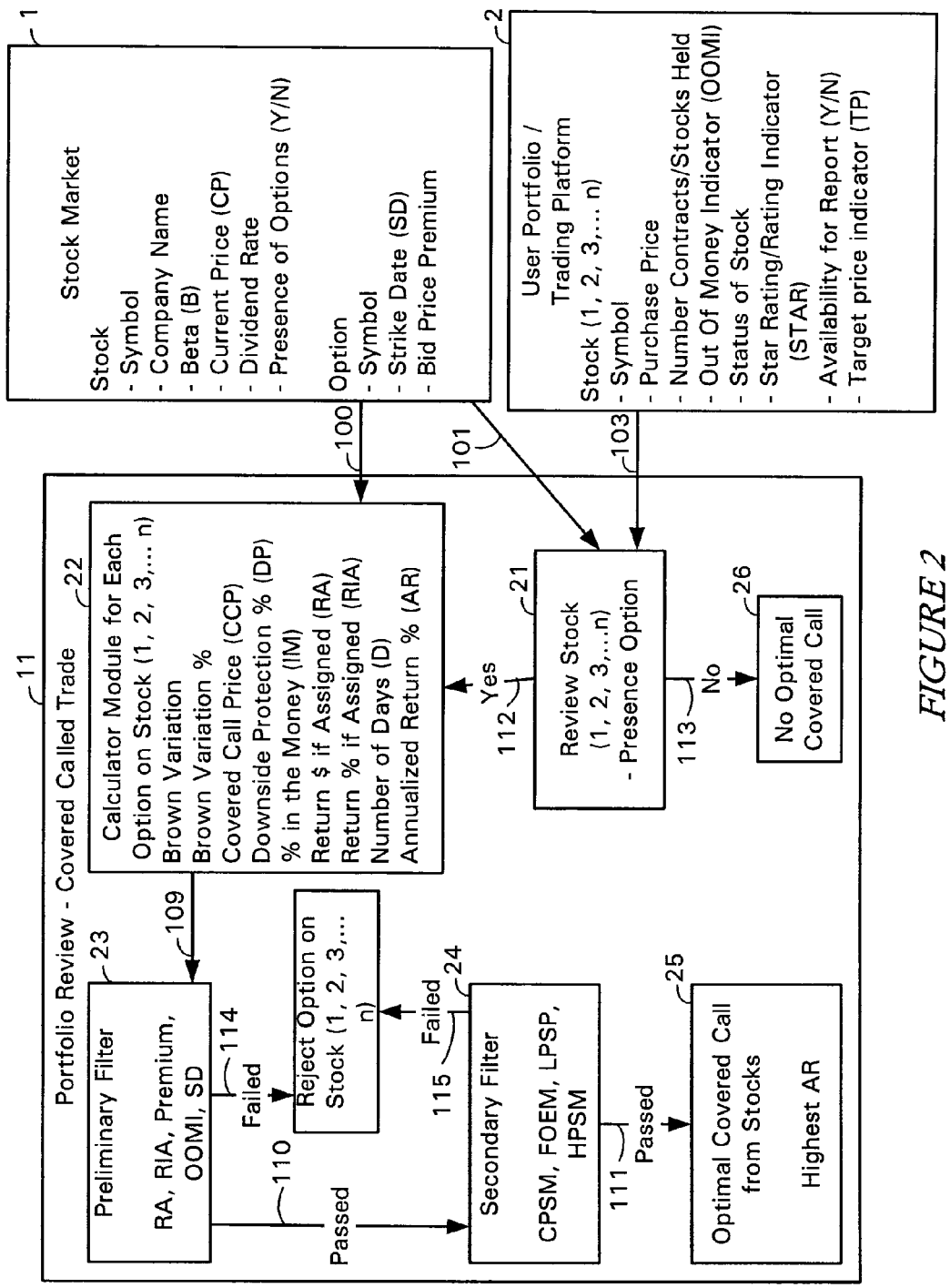
FIG. 2 illustrates in greater details and according to another possible embodiment the trading platform, the stock market, and the portfolio analysis system shown in FIG. 1 for a covered call trade.
Figure 3:
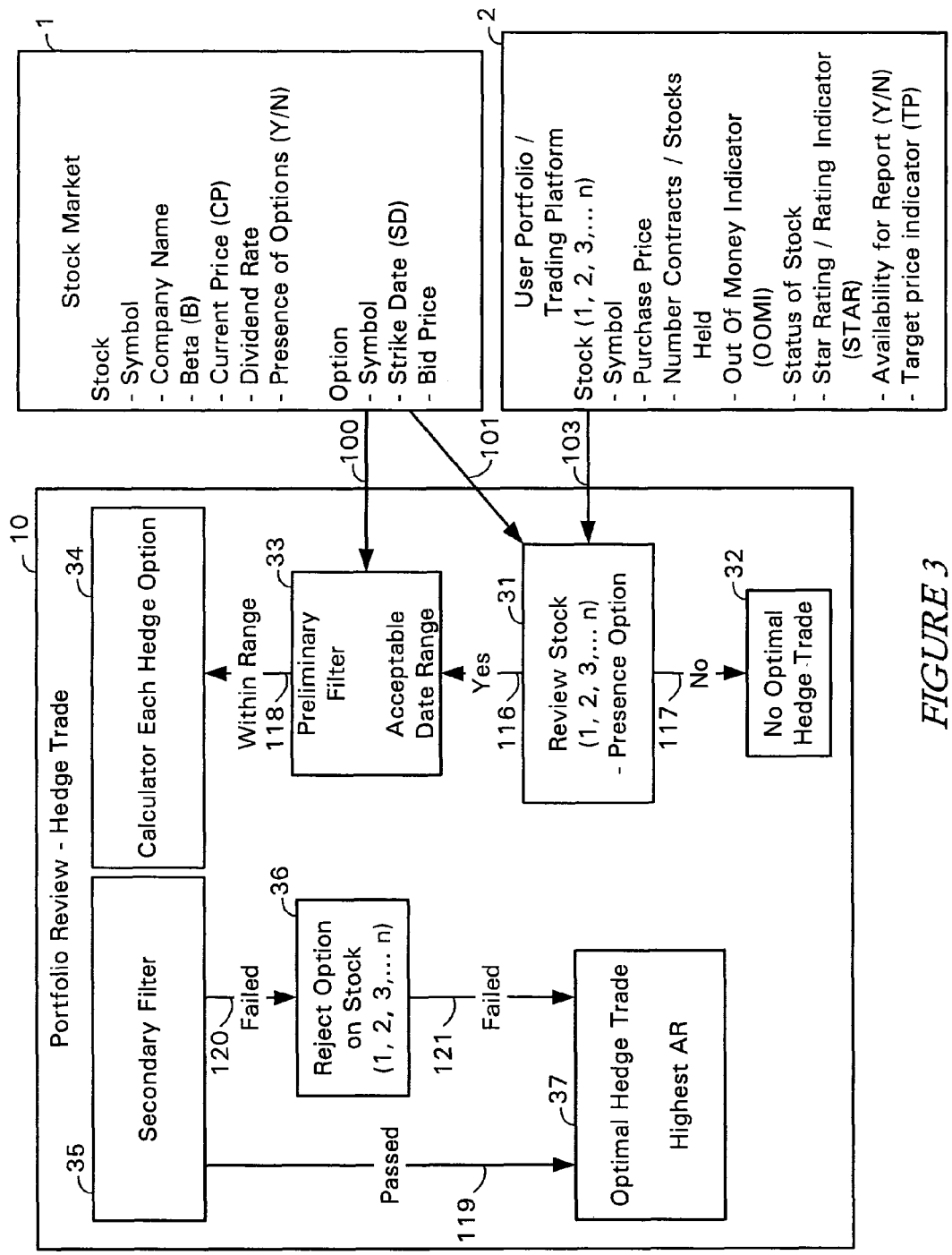
FIG. 3 illustrates in greater details and according to another possible embodiment the trading platform, the stock market and the portfolio analysis system shown in FIG. 1 for a hedge trade.
Figure 6:
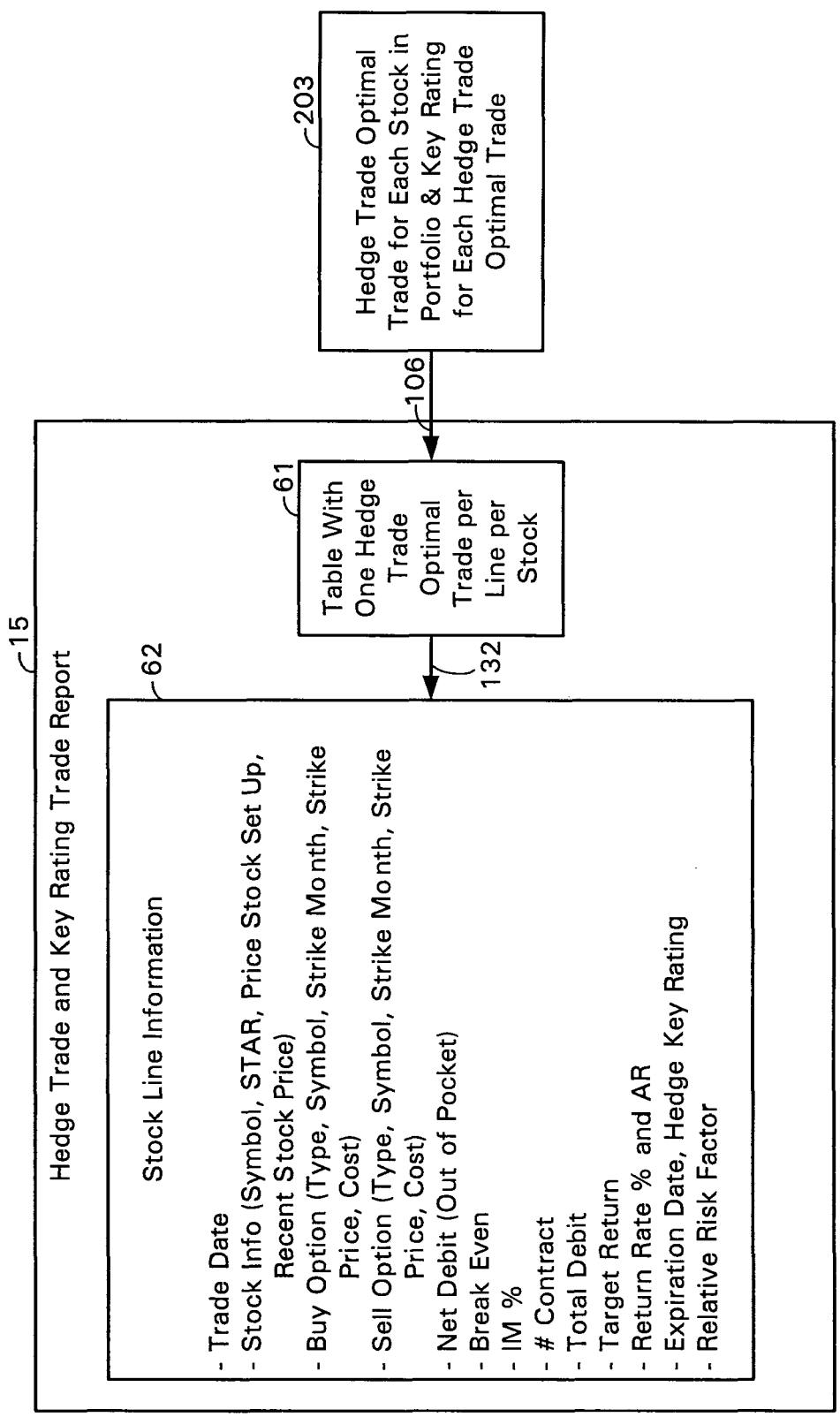
FIG. 6 illustrates in greater details and according to another possible embodiment the optimal report shown in FIG. 1 for a hedge trade.

FIG. 2 illustrates in greater details and according to another possible embodiment the trading platform 2, the stock market 1, and the portfolio review 11 shown in FIG. 1 for a covered call trade where additional details are provided relating to a potential embodiment of the portfolio review module 11. FIG. 3 illustrates in greater details and according to another possible embodiment the trading platform 2, the stock market 1, and the portfolio review 10 shown in FIG. 1 for a hedge trade where additional details are provided relating to a potential embodiment of the hedge trade portfolio review 10. FIG. 4 illustrates in greater detail and according to another possible embodiment the key rating determination as shown in FIG. 1 for a covered call and a hedge trade 4. FIG. 5 illustrates in greater detail and according to another possible embodiment the optimal report as shown in FIG. 1 for a covered call trade 14. Finally, FIG. 6 illustrates in greater detail and according to another possible embodiment the optimal report as shown in FIG. 1 for a hedge trade 15.

While a display 6 is shown in FIG. 1 as the screen of a personal computer 201, what is contemplated is any display, including but not limited to paper printers or other displays where information can be provided to a shareholder. FIG. 1 also shows a single portfolio with stocks and options, but it is understood by one of normal skill in the art that any conglomeration of assets associated with stocks or other shares that may be traded on a stock market or any other platform where equity investments are found is contemplated. What is described as an investor does not necessarily relate to a single individual but includes any potential person, association, conglomerate, corporate entity, or other equivalent group able to invest in stocks and options and able to own a portfolio. By way of nonlimiting example, the ownership of a portfolio of stocks and options by a mutual fund and managed by a mutual fund operator is contemplated and falls within the definition of the investor described herein. What is contemplated as a trade report is not limited to a digital stream of information that can be displayed on a computer display. The report may also be stored and managed in digital format for use over an internet, intranet, or extranet, or the report may be printed as a hard copy on paper or other physical media. The report may also be sent to a wireless device, stored in a personal digital assistant (PDA), or any other communication device able to store and display such a report.

By way of additional disclosure, FIG. 2 illustrate a potential combination of different elements, features, and sub features used in conjunction with the embodiment disclosed in FIG. 1 to practice the invention. The stock market 1 is shown as having different stocks and options. The stock market, in addition to offering trading tools available for trading, provides and manages information relating to the stocks and options. For instance, a series of features of the stocks and options is shown, but it is understood that many other features and elements relating to stocks and options are contemplated. For example, the stock market 1 may include information relating to previous trading sessions, stock split history, and the like. While these and numerous other elements are not shown, what is contemplated is the full and complete range of elements relating to stocks and options. FIG. 2 shows as a possible implementation of the stock market 1 where a stock having a symbol, a company name, a beta (β), the current price (CP) of the stock, the dividend rate, and the presence of option (Y/N) is given. The information relating to options, calls, or puts include but is not limited to a symbol, a name or other denomination, a strike date (SD), a bid price (BP), a premium, and numerous other secondary categories of information such as the types of contract sold, the minimum quantities of options sold per contract, etc. What is contemplated is all of the information found and normally available on the stock market relating to stocks and options. Initially, the portfolio review module (shown as 11 in FIGS. 2 and 10 in FIG. 3) imports the user's portfolio information from the trading platform or any location where this information may be found. FIGS. 2-3 show a typical list of data associated with the numerous stocks numbered 1, 2, 3, . . . n from the user's portfolio. This information includes but is not limited to a symbol, a purchase price, the number of contracts or stocks held, the out of money indicator (OOMI), the status of the stock, the star rating indicator (STAR) of the stock or any other rating of the stock, the availability of the stock for a report as selected by a user or determined by any other third party, and a target price indicator (TP). The portfolio review is designed to find an optimal covered call for a stock 25 shown in FIG. 2 or from an hedge trade 37 shown in FIG. 3. In a first step, the module reviews if the stock has options 21, 31. If the stock has no options 21, 31, then no optimal information can be obtained and the stock is stored 113, 117 along with this information indicating that neither an optimal covered call 26 nor an optimal hedge trade 32 is available at this time. In one possible embodiment of the invention, the report lists each stock in the portfolio, including those stocks that do not have any options. In a preferred embodiment, only the stocks with optical covered calls or optimal hedge trades are displayed. While two possible displays are suggested, what is contemplated is any combination or user display of the relevant information associated with the review of a portfolio.

While the methodology of calculation of the optimal covered call trade and the optimal hedge trade varies as shown in FIGS. 2-3, both use a calculator to determine a series of factors to be inserted in a preliminary filter 23, 33 in order to reject a first series of options associated with each stock. In a secondary step, the secondary filter 24, 35 provides the optimal hedge trade module 37 and the optimal covered call module 25 with possible trades. Finally, the optimal hedge trade module 37 and the optimal covered call module 25 use a last determination in order to find, when possible, a single optimal trade for either the hedge trade shown in FIG. 3, and the covered call shown in FIG. 2.

FIG. 2 shows one possible embodiment of the portfolio review 11 designed to obtain the optimal covered call 25 from stocks found in the user's portfolio 2 based on option information found in the stock market 1. As described above, once the portfolio information is obtained from the trading platform 2 or any other alternative source, a first module 21 reviews the stock market for the presence of options 21. Not all stocks have option trading. If there is no option found for the stock, then the information is stored 113 where no optimal covered call 26 can be found. In a second step 22, a calculator module reviews each successive option for the stocks in the portfolio 2. Several factors are called in turn from the stock market as associated with the investor's portfolio: the brown variation, the brown variation percentage, the covered call price (CCP), the downside protection in percentage (DP) resulting from successive trades, the percentage in the money (IM), the return in dollars if assigned (RA), the return in percentage if assigned (RIA), the number of days of the option (D), and the annualized return in percentage (AR). The brown variation is defined as a fixed factor between the premium and the asked price. In one preferred embodiment, a brown factor of 5¢ per trade is taken. Since both the CP of a stock and the premium are subject to market fluctuation between the time the report is created and when the investor decides to place the trade, the fudge factor allows for the use and calculation using an asked price, not the premium. The different values calculated may be defined in a preferred embodiment as the following:

$CCP = CP - \text{premium}$ $\text{brown variation} = \text{last price} - \text{premium}$ $\text{downside protection} = \text{premium}/CP$ $IM = (CP - BP)/CP$ $RA = BP - CCP$ $RIA = RA/CCP$ D=SD-report day (in days)

AR=(RIA/D)*365

A series of values and calculated variables are provided by way of example to illustrate one possible embodiment of the present disclosure, but what is contemplated is the use of any combination of variables or value associated with a stock. What is also contemplated in the present disclosure is the use of other variables and values taken directly from the stock market or the user's portfolio that provide the same resulting information. The AR is a value that guides investors by showing potential annual return if an option is exercised at the current premium price and bid price for one full year. Downward protection provides information relative to this return when compared with the stock price. What is contemplated is the search for options that provide the best downward protection, provide the highest annualized return, have a positive out-of-money indicator, have a low premium, and have a strike date set at a distance in the future adequate to protect the trader. By way of nonlimiting example, very short trades may present the inherent problem of being subject to greater daily market fluctuations, whereas long trades are vulnerable to external factors associated with the management of the corporation.

In one preferred embodiment, these calculated values are then used 109 by a preliminary filter 23 in order to make a first level of selection from the often numerous available options available for a covered call of a stock. In one preferred embodiment, that is subject to market variation, inflation, and changes based on observed results, shown as 114. Stocks option trades are rejected if the SD is less than 60 days or greater than 370 days away. The OOMI is currently defined as a series of plusses or no plus. If the OOMI is not a plus, then the bid price must be below the current stock price, if the OOMI is at least one plus, then the BP must be above the CP but not by more than 5% for each plus sign associated with the OOMI. Another possible preliminary filter factor is the need for the premium to be equal to or greater than 800, and the RIA must be at least 2% of the RA or assigned to be at least $2. While a series of values are given by way of example and illustrate a preferred embodiment, what is known in the art is the capacity to modulate and change these filtering parameters based on a plurality of conditions. Options trades that do not meet the requirements of the preliminary filter 23 are removed 114 from the list of possible optimal covered calls.

A second filter 24 is then used to select from the remaining options for each stock a single optimal covered call. The secondary filter consists of defining the closest possible strike month (CPSM), the farthest out expiration month (FOEM), the lowest possible strike price (LPSP), and the highest possible strike price (HPSP) for each remaining options. The determination of CPSM and FOEM have already been validated by the preliminary filter to be within 60 to 370 days from the date. The CPSM and FOEM are calculated based on a value table that fixes end dates to a trading calendar. For example, a March 2007 expiration date may be associated with Mar. 17, 2007, based on table calculations. The LPSP is calculated as the lowest BP possible based on the OOMI is the CP plus 3% for each plus in the OOMI. If OOMI has no plus signs, then the current stock price is calculated minus 3% and minus 500. Finally, the HPSP is calculated as the highest BP possible based on the OOMI and is the CP plus 6% if the stock has an OOMI plus sign. If the stock does not have an OOMI plus sign, then a value of CP plus 1% is calculated. The secondary filter 24 compares the SD and the BP of each option with these new values to determine if the option can qualify as the potential optimal trade 111. Finally, the optimal covered call is obtained from the remaining options having the highest AR. These filtering tools correspond only to a preferred embodiment and should not be intended as limiting the scope of the above disclosure.

The methodology for finding the optimal hedge trade is similar to the methodology for finding the covered call described above. FIG. 3 shows the steps associated with the calculator 34 and the filters 33, 35 to be used during the determination. A hedge trade is defined as the conjunction of two contract options working in tandem to project a put position on a first short contract. The hedge trade is determined by first identifying an optimal put contract as defined here above. This contract must be at a SD located between the CPSM and the FOEM, generally 60 to 370 days out. What is then required is the determination of a second purchase option contract that covers the entire duration of the trade or that is located at a sufficient distance in time to prevent repositioning. The purchase option in a preferred embodiment must be at least 6 months away, possibly in January of the next available year. For example, a put position in September 2006 with a strike date of 12 months would expire in September 2007. The purchase position associated must be at least 6 months after the SD and must occur in January, so it cannot be January 2007. Rather, it must be January 2008. These values reflect an illustration of a preferred embodiment and do not in any way limit the scope of the disclosure. Other possible dates and time intervals are contemplated. These dates correspond to a preliminary filter shown as 33 in FIG. 3. Each potential purchase position is analyzed in the way described above in order to determine all relevant parameters including but not limited to the bid price, the asked price, the premium, the brown variation, the brown variation percentage, the covered call price (CCP), the downside protection in percentage (DP) resulting from successive trades, the percentage in the money (IM), the return in dollars if assigned (RA), the return in percentage if assigned (RIA), the number of days of the option (D), and the annualized return in percentage (AR). In one preferred embodiment, the secondary filter 35 include a strike date of at least 180 days away but not more than 550 days away, the profit on the trade if assigned must be at least 700, and the return rate if assigned must be at least 2%. Finally, the annualized return rate, if assigned must be at least 8%. The numerical values given are again only illustrative of a potential preferred embodiment. What is contemplated is any reasonable variation of these figures that leads to the same end result. Once again, of the purchase positions associated with the stock having the highest annualized return rate are taken as the optimal hedge trade 37.

In one embodiment of the present disclosure, both the optimal covered call and the optimal hedge trade are associated with a key rating factor defined to guide users toward more profitable trades. In one possible embodiment, a five-level key rating system is provided as a preferred embodiment. This rating indicates the relative risk of losing the stock if the stock price rises higher than the bid price before the strike date. One key equates to a highest relative risk, two keys to a considerable relative risk, three keys to a moderate relative risk, four keys to a low relative risk, and five keys to the lowest relative risk. While one potential rating factor is disclosed, what is contemplated is any factor used to provide the portfolio manager and investor with a relative indication of which stock is likely to hit the bid price. Either the stock is sold under the option contract or a stock needs to be purchased to cover a second put option.

The key rating for the optimal covered call 25 for each stock in the investor's portfolio 2 is calculated from key rating factors such as the star rating (STAR), the CP, the calculated 12-month target price, the SD, the Bid price, and the β. From these values, a pro rata range is calculated for each of six factors: the STAR rating for 35% of the value, the IM for 15% of the value, the downward protection for 12.5% of the value, the days to expiration for 15% of the value, the price relative to target for 12.5% of the value, and the β for the remaining 15% of the value. The values are prorated based on possible values ranging from 5 to 1 for the Star rating with 5 being the best, an IM ranging from −20% to +10% with −20% being the best, a downside protection ranging from 10% to 0% with 10% being the best, the days to expiration ranging from 365 days to 30 days with 365 days being the best if no OOMI plus is found, the days to expiration ranging from 1 to 365 days with 365 days being the worst if an OOMI plus is found, the price relative to target ranging from 80% to 110% with 80% being the best, and finally the β ranging from 0.5 to 2 with 0.5 being the best. These values are then normalized on a scale of 1 to 5, averaged, and rounded to obtain the key rating factor. For example, if the best of each factor is found, then every normalized value is a 5 and the rounded value is 5 keys. If the worst of each factor is found in the option to be reviewed, then every normalized value is a 1 and the rounded value is 1 key. These values are shown as element 42 in FIG. 4 but only represent one preferred embodiment. What is contemplated is the use of a plurality of factors in order to provide a rating scale. What is also contemplated is the modification and change of these parameters according to evolving market conditions. For example, in a volatile market, the days to expiration may be given less weight, and other factors, such as the downside protection, may be given greater weight. While one possible embodiment is shown, one of ordinary skill in the art understands the potential of the disclosure in relationship with market conditions.

FIG. 4 shows how the key rating is found for an hedge trade 12. The covered call key rating is first determined as describe above 13 and is then corrected based on the STAR rating of each trade bought. The overall hedge trade for a trade is a combination of the first key rating corrected for the star rating of the option contract bought to cover the put option contract. In a preferred embodiment, if the option contract bought is rated at 5 STARS, then the key rating value determined is lowered by 0.5 after being normalized and is rounded to the closest integer. If the STAR rating is 4, then the key value is lowered by 0.75. If the rating is 3, it is lowered by 1.2. If the STAR rating is 2, the key value is lowered by 1.5. And finally, if the STAR rating is only 1, then the key factor is lowered by 2 to a resulting value never to be lower than 1.

In an nonlimiting example, if a key rating for a covered call of 3.8 rounded to 4 is found based on the put option contract, and a optimal hedge trade of only 2 STARS is determined to be the best available option for the hedge trade, then the new calculated key rating is 3, or 3.8 minus 1.2 (2.6 rounded to 3). While one possible method for determining a key rating value is shown, what is contemplated is any combination of parameters and correction factors.

In a preferred embodiment, the report includes a customized section showing the date when the report was prepared, the advisor's name, the advisor's contact phone number, the total stock value of the portfolio, the potential income for now, the return in percentage, the average risk in rating keys, the potential annual income in dollars, the minimum and maximum period in days, and the annualized return in percentage. The report includes seven more sections: a summary, a description how the report was prepared, a description how to use the report, the outlook for the general market of the Standard & Poor, the strategy for selling covered calls on portfolio stocks, the time considerations for this strategy, and the primary risk for the strategy. In addition, the potential income generating trade table is given as described above. This table is made of successive lines for each stock in a first area where the basic information about the underlying stock is given, including but not limited to the stock symbol, the S&P STAR rating, the target date in days, the target price in dollars, the basis of acquisition in dollars, the number of shares owned and the option symbol, and the current stock price. In a second line, the option-specific information relating to the optimal covered call uncovered by the disclosure is listed. This information includes the option strike price (BP), the number of contract sold, the expiration date (SD), the premium (also called the bid price per share), the downward protection in dollars, the percentage of downward protection, the strike percentage from the stock price, the return in dollars, the return as a percentage of the basis, the annualized return rate, the key rating, the potential call sales per year, and the annualized amount in dollars. Table explanations for each of these factors is provided to the user. Finally, the report includes potential outcomes of the covered call income strategy as described in a number of possible cases, important assumptions, and warnings, risks, and other considerations.

In another possible preferred embodiment, a stock hedge strategy report is created and includes a summary table for the covered call trade for each stock. The summary table contains a trade date, a stock symbol, the put option, the sell amount in dollars for the premium, the net debit or break even, the percentage in downside protection, the assigned return date, the percentage in the money, and the expiration date along with the key rating. In the second part of the report, a hedge trade summary table is provided. The table includes columns with the trade date, the stock symbol, the buy option, the put option, the net debit, the break even, the percentage in the money, the number of contracts, the total debit, the target return, the return date, and the near-term expiration date along with the key rating. The tables and key rating are explained in the report. Finally, a section on the essential information on these types of trades is listed.

FIGS. 5-6 illustrate a potential type of report according to a preferred embodiment of the present disclosure. FIG. 5 shows a table 51 where stock line information 52 and option line information 210 are provided. FIG. 6 shows a table 61 where each line is dedicated to a different stock. The stock line information 62 includes several categories of information. While one preferred embodiment is provided, it is understood by one of ordinary skill in this art that any of a number of different structures and arrangements of different categories of information can be provided. What is also contemplated is a dynamically created report that provides only a portion of the information on the initial page and requires an action from the report reader to access the remaining information. By way of a nonlimiting example, a dynamic HTML page can be created where the specific information is arranged and accessible by following a plurality of dynamic links. What is also contemplated is the use of a fragmented report or the creation of a website where the information is replaced continuously and updated at regular intervals. What is also contemplated is the creation of a series of orders prepared for a portfolio owner in anticipation of the placement of orders with the stock market 1 via a trading platform 2 or placed directly with a stock market 1 quipped with trading capacity.

In yet another embodiment, the stock portfolio analysis system 150 includes a display 6, a calculator 200 for the determination of an optimal hedge trade for each of a plurality of stocks within a stock investor's portfolio 10, the calculator 3 being operatively coupled to the display 108, a device for generating a trade report 201 on the display 6 comprising at least a data table 15 having a plurality of entries corresponding to the optimal hedge trade for each of the plurality of stocks within the stock portfolio 9, and an associated optimal covered call trade corresponding to each of the optimal hedge trades, the device operatively coupled 108 to the display 6, wherein each entry further comprises a key rating determination 12 for optimal hedge trade and the associated optimal covered call trade. The stock portfolio analysis system 150 further includes a trading platform 2 for storing in a memory unit (not shown) the stock investor's portfolio 9, the trading platform being coupled to the device for generating the trade report 5. The stock portfolio analysis system 150 also includes a calculator comprising a preliminary filter 33 and a secondary filter 35 for the determination of the optimal hedge trade based on the highest AR value from among the list of available hedge trades for the stocks having passed the preliminary filter 33 and the secondary filter 35.

In another embodiment, the income portfolio trade report 5 includes a covered call summary table 14 with a plurality of entries corresponding to a plurality of stocks selected from a user's stock portfolio 9, a table explanation section with descriptions of a series of parameters corresponding to each of the plurality of entries, and a financial summary section with a summary of the user's stock portfolio, where each of the plurality of entries includes an optimal covered call trade selected from a list of available covered calls and a key rating. The trade report 5 also includes descriptions of the series of parameters in the table explanation section corresponding to a series of parameters assigned to each of the plurality of entries in the covered call summary table.

In yet another embodiment, the income portfolio trade report 5 includes a hedge trade summary table 15 with a plurality of entries corresponding to a plurality of stocks selected from a user's stock portfolio 9, a table explanation section with descriptions of a series of parameters corresponding to each of the plurality of entries, and a financial summary section comprising a summary of the user's stock portfolio, where each of the plurality of entries includes an optimal covered call trade selected from a list of available covered calls, a stock position, and a key rating. The trade report 5 also includes descriptions of the series of parameters in the table explanation section corresponding to a series of parameters assigned to each of the plurality of entries in the hedge trade summary table. In yet another embodiment, the trade report 5 includes a stock position for a stock in the user's stock portfolio where the position is a buy call option of the hedge trade.

In another embodiment of the present disclosure, what is contemplated is a computer-readable medium having stored thereon instructions that, when executed by a processor, cause the processor to compute an optimal covered call trade for each of a plurality of stocks within a stock portfolio of an investor 9, compute a key rating for each of the optimal covered calls 13, produce an income portfolio trade report 14 comprising a covered call trade summary table further comprising a plurality of entries corresponding to the plurality of stocks selected from the investor's stock portfolio where each of the plurality of entries further comprises the optimal covered call trade and the key rating. The computer-readable medium also has instructions that, when executed by a processor, cause the processor to compute an optimal covered call 10 trade for each of a plurality of stocks within an investor's stock portfolio 9, compute an associated optimal hedge trade 10 for each of the plurality of stocks within the investor's stock portfolio, compute a key rating for each of the optimal covered calls 13 and the associated optimal hedge trade 12, and produce an income portfolio trade report comprising a hedge trade summary table 15 with a plurality of entries corresponding to the plurality of stocks selected from the investor's stock portfolio, wherein each of the plurality of entries further comprises the optimal covered call trade, the optimal hedge trade, and the key rating.

The invention is not limited to the particular details of the apparatus or method depicted, and other modifications and applications may be contemplated. Further changes may be made in the above-described method and device without departing from the true spirit of the scope of the invention herein involved. It is intended, therefore, that the subject matter in the above depiction should be interpreted as illustrative, not in a limiting sense.

What is claimed is:

1. A method for generating an income portfolio trade report, the method comprising the steps of:
    receiving and reviewing, by a computer system, information from a stock portfolio of an investor, information from a stock market for each of the stocks in the plurality of stocks within the stock portfolio of the investor, and information about options associated with each of the stocks in the plurality of stocks in the stock portfolio of the investor, wherein the step of reviewing the information further includes the steps of:
    calculating, by the computer system, an annualized return rate for each of the stocks in the plurality of stocks within the stock portfolio of the investor, and calculating an optimal covered call trade from a list of available covered calls for each of the stocks in the plurality of stocks within the stock portfolio of the investor, wherein said step of calculating the optimal covered call trade further includes the steps of:
    filtering, by the computer system, for each of the stocks in the plurality of stocks within the stock portfolio of the investor based upon market variation, inflation, or changes based on observed results,
    and selecting, by the computer system, for each of the stocks an associated covered call trade representing an optimal covered call trade based on the stock having a highest annualized return rate from having passed through the filter;
    generating, by the computer system, the income portfolio trade report, wherein said income portfolio trade report includes:
    a covered call summary table comprising a plurality of entries corresponding to the plurality of stocks in the stock portfolio of the investor, the optimal covered call trade selected for each of the plurality of stocks in the stock portfolio of the investor, and the annualized return rate associated with each of the plurality of stocks in the stock portfolio of the investor;
    a table explanation section comprising a description of a series of parameters corresponding to each of the plurality of entries corresponding to the plurality of stocks in the stock portfolio of the investor and the optimal covered call trade selected for each of the plurality of stocks in the stock portfolio of the investor; and
    a financial summary section comprising a summary of the plurality of entries corresponding to the plurality of stocks in the stock portfolio of the investor.

2. A non-transitory computer readable medium having instructions embodied thereon for generating an income portfolio trade report, said instructions when executed by a processor, causes the processor to perform operations comprising:

receiving and reviewing information from a stock portfolio of an investor, information from a stock market for each of the stocks in the plurality of stocks within the stock portfolio of the investor, and information about options associated with each of the stocks in the plurality of stocks in the stock portfolio of the investor, wherein the step of reviewing the information further includes the steps of:

calculating an annualized return rate for each of the stocks in the plurality of stocks within the stock portfolio of the investor, and calculating an optimal covered call trade from a list of available covered calls for each of the stocks in the plurality of stocks within the stock portfolio of the investor, wherein said step of calculating the optimal covered call trade further includes the steps of:

filtering for each of the stocks in the plurality of stocks within the stock portfolio of the investor based upon market variation, inflation, or changes based on observed results, and selecting for each of the stocks an associated covered call trade representing an optimal covered call trade based on the stock having a highest annualized return rate from having passed through the filter;

generating the income portfolio trade report, wherein said income portfolio trade report includes:

a covered call summary table comprising a plurality of entries corresponding to the plurality of stocks in the stock portfolio of the investor, the optimal covered call trade selected for each of the plurality of stocks in the stock portfolio of the investor, and the annualized return rate associated with each of the plurality of stocks in the stock portfolio of the investor;

a table explanation section comprising a description of a series of parameters corresponding to each of the plurality of entries corresponding to the plurality of stocks in the stock portfolio of the investor and the optimal covered call trade selected for each of the plurality of stocks in the stock portfolio of the investor; and a financial summary section comprising a summary of the plurality of entries corresponding to the plurality of stocks in the stock portfolio of the investor.

3. A system for generating an income portfolio trade report, the system comprising:

a processor configured to:

receive and review information from a stock portfolio of an investor, information from a stock market for each of the stocks in the plurality of stocks within the stock portfolio of the investor, and information about options associated with each of the stocks in the plurality of stocks in the stock portfolio of the investor, wherein the processor configured to review the information further includes the processor being configured to:

calculate an annualized return rate for each of the stocks in the plurality of stocks within the stock portfolio of the investor, and calculate an optimal covered call trade from a list of available covered calls for each of the stocks in the plurality of stocks within the stock portfolio of the investor, wherein the processor configured to calculate the optimal covered call trade further includes the processor being configured to:

filter for each of the stocks in the plurality of stocks within the stock portfolio of the investor based upon market variation, inflation, or changes based on observed results, and select for each of the stocks an associated covered call trade representing an optimal covered call trade based on the stock having a highest annualized return rate from having passed through the filter;

generate the income portfolio trade report, wherein said income portfolio trade report includes:

a covered call summary table comprising a plurality of entries corresponding to the plurality of stocks in the stock portfolio of the investor, the optimal covered call trade selected for each of the plurality of stocks in the stock portfolio of the investor, and the annualized return rate associated with each of the plurality of stocks in the stock portfolio of the investor;

a table explanation section comprising a description of a series of parameters corresponding to each of the plurality of entries corresponding to the plurality of stocks in the stock portfolio of the investor and the optimal covered call trade selected for each of the plurality of stocks in the stock portfolio of the investor; and a financial summary section comprising a summary of the plurality of entries corresponding to the plurality of stocks in the stock portfolio of the investor.

* * * * *